United States Patent
Zhang et al.

(10) Patent No.: US 12,131,632 B1
(45) Date of Patent: Oct. 29, 2024

(54) METHODS FOR TRAFFIC FLOW CONTROL CONSIDERING BUS STOPS IN CONNECTED ENVIRONMENT

(71) Applicants: HEFEI UNIVERSITY OF TECHNOLOGY, Anhui (CN); ANHUI BAICHENG HUITONG TECHNOLOGY CO., LTD., Anhui (CN); HEFEI UNIVERSITY OF TECHNOLOGY DESIGN INSTITUTE (GROUP) CO., LTD., Anhui (CN)

(72) Inventors: Weihua Zhang, Hefei (CN); Taifeng Ni, Hefei (CN); Heng Ding, Hefei (CN); Chun Wang, Hefei (CN); Wenjia Zhu, Hefei (CN); Zeyang Cheng, Hefei (CN); Ye Yu, Hefei (CN); Haijian Bai, Hefei (CN); Wanli Dong, Hefei (CN); Huiwen Liu, Hefei (CN)

(73) Assignees: HEFEI UNIVERSITY OF TECHNOLOGY, Hefei (CN); ANHUI BAICHENG HUITONG TECHNOLOGY CO., LTD., Hefei (CN); HEFEI UNIVERSITY OF TECHNOLOGY DESIGN INSTITUTE (GROUP) CO., LTD., Hefei (CN)

( * ) Notice: Subject to any disclaimer, the term of this patent is extended or adjusted under 35 U.S.C. 154(b) by 0 days.

(21) Appl. No.: 18/648,322

(22) Filed: Apr. 26, 2024

(30) Foreign Application Priority Data

Apr. 26, 2023 (CN) .......................... 202310460402.9

(51) Int. Cl.
*G08G 1/01* (2006.01)
*G08G 1/052* (2006.01)
*G08G 1/123* (2006.01)

(52) U.S. Cl.
CPC ......... *G08G 1/0145* (2013.01); *G08G 1/0129* (2013.01); *G08G 1/052* (2013.01); *G08G 1/123* (2013.01)

(58) Field of Classification Search
CPC .... G08G 1/0145; G08G 1/0129; G08G 1/052; G08G 1/123
See application file for complete search history.

(56) References Cited

U.S. PATENT DOCUMENTS 10,600,319 B1 * 3/2020 Shuff ................... G08G 1/0116
11,912,282 B2 * 2/2024 Hong ................... B60W 40/105
(Continued)

FOREIGN PATENT DOCUMENTS

CN     105575122 A     5/2016
CN     111311909 A     6/2020
(Continued)

OTHER PUBLICATIONS

Decision to Grant a Patent in Chinese Application No. 202310460402.9 mailed on Mar. 19, 2024, 5 pages.
(Continued)

*Primary Examiner* — Peter D Nolan
*Assistant Examiner* — Wae L Louie
(74) *Attorney, Agent, or Firm* — PORUS IP LLC

(57) ABSTRACT

Embodiments of the present disclosure provide a method for traffic flow control considering a bus stop in a connected environment, comprising: determining an influence region of the bus stop; dividing the influence region of the bus stop into influence subregions; collecting vehicle information of each of the influence subregions at time t; comparing lane changing pressures of different influence subregions of the bus stop; determining a predicted count of lane changing vehicles of each of the influence subregions based on lane changing pressure differences; and selecting optimal lane (Continued)

changing vehicles to complete lane changing. A vehicle density distribution in the influence region of the bus stop can be dynamically regulated through vehicle information interaction in the connected environment, thereby making the spatial distribution of the traffic flow more balanced, saving vehicle traveling time, and improving the operation efficiency of the traffic flow.

3 Claims, 4 Drawing Sheets

(56) References Cited

U.S. PATENT DOCUMENTS

| | | | | |
|---|---|---|---|---|
| 2002/0082806 | A1* | 6/2002 | Kaub | G08G 1/164 |
| | | | | 702/182 |
| 2016/0027300 | A1* | 1/2016 | Raamot | G08G 1/0145 |
| | | | | 340/922 |
| 2016/0040993 | A1* | 2/2016 | Goldberg | G08G 1/0129 |
| | | | | 701/533 |
| 2018/0204450 | A1* | 7/2018 | Song | G08G 1/0145 |
| 2019/0012909 | A1* | 1/2019 | Mintz | G06Q 30/0206 |
| 2019/0236942 | A1* | 8/2019 | Toshack | G08G 1/07 |
| 2020/0234582 | A1* | 7/2020 | Mintz | G08G 1/096811 |
| 2023/0050192 | A1* | 2/2023 | Quirynen | G05B 13/028 |
| 2024/0085193 | A1* | 3/2024 | Tisseur | G01C 21/3469 |
| 2024/0183262 | A1* | 6/2024 | Chen | E21B 44/00 |

FOREIGN PATENT DOCUMENTS

| | | |
|---|---|---|
| CN | 111959499 A | 11/2020 |
| CN | 113246985 A | 8/2021 |
| CN | 113781806 A | 12/2021 |
| KR | 20180096114 A | 8/2018 |

OTHER PUBLICATIONS

Zhang, Weihua et al., Study on Traffic Row Models Based on Mixed Motor Traffic with Buses, Journal of Highway and Transportation Research and Development, 21(4): 85-89, 2004.

Ximena Jauregui et al., Locations and Length of Entrances and Exits of an Automated Truck Lane on a U.S. Freeway, 2021 Smart City Symposium Prague (SCSP), 2021, 4 Pages.

Zheng, Xiaoyan et al., Countermeasures of Load Distribution Effect Based on Bus Lane, Road Traffic & Safety, 2006, 5 Pages.

* cited by examiner

METHODS FOR TRAFFIC FLOW CONTROL CONSIDERING BUS STOPS IN CONNECTED ENVIRONMENT

CROSS-REFERENCE TO RELATED APPLICATIONS

This application claims priority to Chinese Patent Application No. 202310460402.9 filed on Apr. 26, 2023, the contents of which are hereby incorporated by reference.

TECHNICAL FIELD

The present disclosure relates to the field of traffic control for intelligent connected vehicles, and in particular to a method for traffic flow control considering a bus stop in a connected environment.

BACKGROUND

With the rapid development of economy, the process of urbanization accelerates, and the emergence of a large number of cars brings great pressure to urban traffic. Because of the constraints of urban population and urban space, the principle of public transportation priority as well as sustainable transportation has become the guideline for urban transportation planning. However, with the surge in urban traffic, the large number of bus stops in the urban transportation network has gradually become an obstacle to the development of transportation. The setting of bus stops not only occupies road space resources, but the decelerating and stopping behaviors also have a certain impact on the normal operation of traffic flow.

With the development of intelligent transportation technology, the concept of intelligent transportation is becoming more and more popular, the vehicles are being continuously connected and automated, and a pure connected vehicle driving environment will be realized in the near future. Connected and automated vehicles can not only communicate with each other, but also interconnect with intelligent transportation devices on the road to obtain real-time road information. Connected and automated vehicles are able to obtain information about the surrounding environment in time through wireless communication and other technologies, and upload the information to the cloud for cloud computing, so as to make decisions about lane changing and to improve the operation efficiency of the road traffic flow. Therefore, it is necessary to study the method for traffic flow control considering the bus stop in the connected environment.

SUMMARY

The purpose of the present disclosure is to provide a method for traffic flow control considering a bus stop in a connected environment. The method aims to consider the influence of bus deceleration and stopping, and starting and acceleration on the surrounding traffic flow while ensuring safe traveling of the vehicles, and to make decisions on lane changing by comparing lane changing pressures in different subregions within an influence region of the bus stop and selecting the optimal count of lane changing vehicles to reduce queuing time and avoid traffic congestion, thereby improving the traffic flow efficiency in a bus stop region.

One or more embodiments of the present disclosure provide a method for traffic flow control considering a bus stop in a connected environment. The method may be applied to a road with two lanes in one direction and a bus stop may be provided in a first lane. The method may include the following operations.

1, when a bus travels in the first lane, a distance traveled by an upstream vehicle under the influence of a bus when the bus is in a process of stopping toward the bus stop and a speed of the bus is lower than a traffic flow speed may be taken as a first distance; a distance traveled by the bus when the bus is in a process of leaving the bus stop and the speed of the bus accelerates to the traffic flow speed may be taken as a second distance; and a sum of the first distance and the second distance may be taken as a length L of an influence region of the bus stop;

2, the length L of the influence region of the bus stop may be calculated by using an equation (1).

$$L = L_{up} + L_{down} \qquad (1)$$

Wherein $L_{up}$ denotes an influence distance of the bus on traveling of the upstream vehicle in a process of decelerating and stopping at the bus stop to resuming a uniform speed, i.e., an after-effect influence distance of the bus, and may be obtained by using an equation (2); and $L_{down}$ denotes a distance of the bus in a process of leaving the bus stop to the uniform speed, i.e., a downstream influence distance of the bus, and may be obtained by using an equation (5).

$$L_{up} = (v_f - v_s) \frac{v_f \cdot \eta_1}{(1-\eta_1)v_f - v_s} t_d \qquad (2)$$

Wherein $v_f$ denotes a free flow speed on the road with two lanes in one direction, and $v_s$ denotes a starting speed of the bus; $\eta_1$ denotes a standardized density of road traffic when the bus does not decelerate and may be obtained by using an equation (3); and $t_d$ denotes a predicted stop time of the bus and may be obtained by using an equation (4).

$$\eta_1 = \frac{k_1}{k_e} \qquad (3)$$

$$t_d = a_1 t_{d-1} + a_2 t_{d-2} + \ldots + a_p t_{d-p} + \varepsilon_d + \beta_1 \varepsilon_{d-1} + \ldots + \beta_q \varepsilon_{d-q} \qquad (4)$$

In the equation (3), $k_1$ denotes a traffic density of the road traffic when the bus does not decelerate, and $k_e$ denotes a traffic density when congestion occurs on the road with two lanes in one direction.

In the equation (4), $a_1, a_2, \ldots a_p$ denote p regression coefficients, $\beta_1, \ldots \beta_q$ denote q sliding coefficients; $t_{d-1}, t_{d-2}, \ldots t_{d-p}$ denote p historical stop time of the bus, and $\varepsilon_d, \varepsilon_{d-1}, \ldots \varepsilon_{d-g}$ denote q+1 white noise sequences.

$$L_{down} = \frac{v_b^2}{2a_g} \qquad (5)$$

Wherein $v_b$ denotes a speed at which the bus resumes the uniform speed after leaving the bus stop, and $a_g$ denotes acceleration of the bus.

3, a rectangular region formed by the length L of the influence region and a width of the road with two lanes in one direction may be taken as the influence region, the bus stop may be taken as an origin of the influence region, a traveling direction of the bus may be taken as a positive direction of an x-axis, an x-axis horizontal coordinate of a distance $L_{up}$ between the origin and an upstream road section as $x_{L_{up}}$, and an x-axis horizontal coordinate of a distance $L_{down}$ between the origin and a downstream road section may be taken as $x_{L_{down}}$, thereby dividing the influence region into three subregions.

A first subregion is a rectangular region in the first lane with a central position of the bus as a start point and the $x_{L_{down}}$ as an end point.

A second subregion is rectangular region in a second lane with the $x_{L_{up}}$ as a start point and the $x_{L_{down}}$ as an end point.

A third subregion is a rectangular region in the first lane with the central position of the bus as a start point and the $x_{L_{down}}$ as an end point.

4, a vehicle position, a vehicle speed, and a vehicle acceleration in each of the three subregions within the influence region of the bus stop at time t may be obtained using an intelligent connected roadside facility.

5, a lane changing pressure of an nth subregion at the time t may be calculated using an equation (6), wherein n=1, 2, 3.

$$\begin{cases} c_n(t) = K_{n,pre}(t) + v_{n,pre}(t) \\ K_{n,pre}(t) = \frac{\lambda_1(k_n(t) - k_m)}{k_m} \Delta t \\ v_{n,pre}(t) = \frac{\lambda_2(v_f - \overline{v_n}(t))}{v_f} \Delta t \end{cases} \quad (6)$$

Wherein $c_n(t)$ denotes the lane changing pressure of the nth subregion at the time t, $K_{n,pre}(t)$ denotes a density pressure of the nth subregion at the time t, and $v_{n,pre}(t)$ denotes a speed pressure of the nth subregion at the time t; $\lambda_1$ and $\lambda_2$ denote regulation parameters, $k_n(t)$ denotes a traffic density of the nth subregion at the time t, and $k_m$ denotes a traffic density of a maximum traffic volume when vehicles travel normally on the road with two lanes in one direction; $\overline{v_n}(t)$ denotes an average speed of all vehicles in the nth subregion at the time t; and $\Delta t$ denotes a time interval.

6, a lane changing pressure difference $\Delta C_{r,r+1}(t)$ between an rth subregion and an (r+1)th subregion at the time t may be calculated by using an equation (7), thereby obtaining a lane changing pressure difference $\{\Delta C_{r,r+1}(t)|r=1,2\}$ of all the subregions.

$$\Delta C_{r,r+1}(t) = c_r(t) - c_{r+1}(t) \quad (7)$$

Wherein $c_r(t)$ denotes the lane changing pressure of the rth subregion at the time t, $c_{r+1}(t)$ denotes the lane changing pressure of the (r+1)th subregion at the time t, and r=1, 2.

7, two subregions having largest absolute values of the lane changing pressure differences may be selected from the lane changing pressure difference $\{\Delta C_{r,r+1}(t)|r=1,2\}$ of all subregions to be prioritized for lane changing.

Whether $\Delta C_{r,r+1}(t) > 0$ is valid may be determined. If $\Delta C_{r,r+1}(t) > 0$ is valid, operation 7.1 may be performed; otherwise, operation 10 may be performed.

7.1, whether $|\Delta C_{r,r+1}(t)| > \theta$ is valid may be determined. If $|\Delta C_{r,r+1}(t)| > \theta$ is valid, operation 7.2 may be performed; otherwise, lane changing of the vehicles within the influence region of the bus stop may be prohibited, and operation 13 may be performed; wherein $\theta$ denotes a lane changing threshold.

7.2, a count of vehicles $N_{r \to r+1}(t)$ that are allowed to transfer from the rth subregion to the (r+1)th subregion may be calculated by using an equation (8).

$$\left(\frac{\lambda_1}{k_m} + \frac{\lambda_2}{v_f k_e}\right)\left(\frac{N_r(t) - N_{r \to r+1}(t)}{L_r(t)} - \frac{N_{r+1}(t) + N_{r \to r+1}(t)}{L_{r+1}(t)}\right) = \theta \quad (8)$$

Wherein $N_r(t)$ denotes a count of vehicles in the rth subregion at the time t, and $L_r(t)$ denotes a length of the rth subregion at the time t; $N_{r+1}(t)$ denotes a count of vehicles in the (r+1)th subregion at the time t, and $L_{r+1}(t)$ denotes a length of the (r+1)th subregion at the time t.

8, an ith vehicle in the rth subregion within the influence region of the bus stop at the time t is denoted as $q_i^r(t)$, a previous vehicle of the ith vehicle $q_i^r(t)$ in the rth subregion is denoted as $q_{i-1}^r(t)$, a next vehicle in the (r+1)th subregion relative to the ith vehicle $q_i^r(t)$ in the rth subregion is denoted as $q_{j+1}^{r+1}(t)$, and a previous vehicle in the (r+1)th subregion relative to the ith vehicle $q_i^r(t)$ in the rth subregion is denoted as $q_j^{r+1}(t)$.

8.1, whether the ith vehicle $q_i^r(t)$ in the rth subregion at the time t satisfies a safety lane changing condition in an equation (9) may be determined. If the ith vehicle $q_i^r(t)$ in the rth subregion at the time t satisfies the safety lane changing condition in the equation (9), the ith vehicle $q_i^r(t)$ may be added to a lane changing set $P_{r \to r+1}(t)$; otherwise, it is indicated that the ith vehicle $q_i^r(t)$ cannot be transferred to the (r+1)th subregion at a safety lane changing spacing, and the ith vehicle $q_i^r(t)$ continues to travel in the rth subregion, thereby obtaining the lane changing set $P_{r \to r+1}(t)$.

$$\begin{cases} x_{r+1,j}(t) - x_{r,i}(t) \geq L_{r+1,j}(t) \\ x_{r,i}(t) - x_{r+1,j+1}(t) \geq L_{r+1,j+1}(t) \\ L_{r+1,j}(t) = \frac{v_{r+1,j}(t) \cdot \Delta t_c}{3} + 10 - l_{veh} \\ L_{r+1,j+1}(t) = \frac{v_{r+1,j+1}(t) \cdot \Delta t_c}{3} + 10 - l_{veh} \end{cases} \quad (9)$$

Wherein $x_{r+1,j}(t)$ denotes a position horizontal coordinate of $q_j^{r+1}(t)$; $x_{r,i}(t)$ denotes a position horizontal coordinate of $q_i^r(t)$; $x_{r+1,j+1}(t)$ denotes a position horizontal coordinate of $q_{j+1}^{r+1}(t)$; $L_{r+1,j}(t)$ denotes the safety lane changing spacing between $q_i^r(t)$ and $q_j^{r+1}(t)$; $L_{r+1,j+1}(t)$ denotes the safety lane changing spacing between $q_i^r(t)$ and $q_{j+1}^{r+1}(t)$; $v_{r+1,j}(t)$ denotes a speed of $q_j^{r+1}(t)$, and $v_{r+1,j+1}(t)$ denotes a speed of $q_{j+1}^{r+1}(t)$; $l_{veh}$ denotes a length of a vehicle body; and $\Delta t_c$ denotes a duration of lane changing.

9, whether a count of vehicles $M_{r \to r+1}^t \leq N_{r \to r+1}(t)$ in the lane changing set $P_{r \to r+1}(t)$ in the rth subregion within the influence region of the bus stop is valid may be determined. If the count of vehicles $P_{r \to r+1}^t \leq N_{r \to r+1}(t)$ in the lane changing set $P_{r \to r+1}(t)$ in the rth subregion within the influence region of the bus stop is valid, all the vehicles in the lane changing set $P_{r \to r+1}(t)$ in the rth subregion may complete lane changing to the (r+1)th subregion, and operation 13 may be performed; otherwise, a distance $d_{r,i}(t)$ between a vehicle $q_i^r(t)$ in the rth subregion and a previous vehicle $q_{i-1}^r(t)$ may be calculated by using an equation (10) to obtain distances between all the vehicles in the lane changing set $P_{r \to r+1}(t)$ and the previous vehicles, and all the vehicles in the lane changing set $P_{r \to r+1}(t)$ may be arranged in an ascending order based on the distances between all the vehicles and the previous vehicles to select top $N_{r \to r+1}(t)$ vehicles in the rth subregion with smallest spacings to fronts of the previous vehicles to complete lane changing to the (r+1)th subregion, and operation 13 may be performed.

$$d_{r,i}(t) = x_{r,i-1}(t) - x_{r,i}(t) \quad (10)$$

Wherein $x_{r,i-1}(t)$ denotes a position horizontal coordinate of a previous vehicle $q_{i-1}^{r}(t)$ of a vehicle $q_{i}^{r}(t)$ in the rth subregion.

10, whether $|\Delta C_{r,r+1}(t)|>\theta$ is valid may be determined. If $|\Delta C_{r,r+1}(t)|>\theta$ is valid, operation 10.1 may be performed; otherwise, the vehicles within the influence region of the bus stop may not be allowed to change lanes, and the operation 13 may be performed.

10.1, a count of vehicles $P_{r+1 \to r}(t)$ that are allowed to transfer from the (r+1)th subregion to the rth subregion may be calculated by using an equation (11).

$$\left(\frac{\lambda_1}{k_m} + \frac{\lambda_2}{v_f k_e}\right)\left(\frac{N_{r+1}(t) - N_{r+1 \to r}(t)}{L_{r+1}(t)} - \frac{N_r(t) + N_{r+1 \to r}(t)}{L_r(t)}\right) = \theta \quad (11)$$

11, a uth vehicle in the (r+1)th subregion within the influence region of the bus stop at the time t is denoted as $q_u^{r+1}(t)$, a previous vehicle in the (r+1)th subregion relative to the uth vehicle $q_u^{r+1}(t)$ is denoted as $q_{u-1}^{r+1}(t)$, a latter vehicle in the rth region relative to the uth vehicle $q_u^{r+1}(t)$ in the (r+1)th subregion is denoted as $q_{w+1}^{r}(t)$, and a previous vehicle in the rth subregion relative to the uth vehicle $q_u^{r+1}(t)$ in the (r+1)th subregion is denoted as $q_w^{r}(t)$.

11.1, whether the uth vehicle $q_u^{r+1}(t)$ in the (r+1)th subregion at the time t satisfies a safety lane changing condition shown in an equation (12) may be determined. If the uth vehicle $q_u^{r+1}(t)$ in the (r+1)th subregion at the time t satisfies the safety lane changing condition shown in the equation (12), the uth vehicle $q_u^{r+1}(t)$ may be added to a lane changing set $P_{r+1 \to r}(t)$; otherwise, it is indicated that the uth vehicle $q_u^{r+1}(t)$ cannot be transferred to the rth subregion at the safety lane change spacing, and the uth vehicle $q_u^{r+1}(t)$ continues to travel in the (r+1)th subregion, thereby obtaining the lane changing set $P_{r+1 \to r}(t)$.

$$\begin{cases} x_{r,w}(t) - x_{r+1,u}(t) \geq L_{r,w}(t) \\ x_{r+1,u}(t) - x_{r,w+1}(t) \geq L_{r,w+1}(t) \\ L_{r,w}(t) = \frac{v_{r,w}(t) \cdot \Delta t_c}{3} + 10 - l_{veh} \\ L_{r,w+1}(t) = \frac{v_{r,w+1}(t) \cdot \Delta t_c}{3} + 10 - l_{veh} \end{cases} \quad (12)$$

Wherein $x_{r,w}(t)$ denotes a position horizontal coordinate of $q_w^{r}(t)$; $x_{r+1,u}(t)$ denotes a position horizontal coordinate of $q_u^{r+1}(t)$; $x_{r,w+1}(t)$ denotes a position horizontal coordinate of $q_{w+1}^{r}(t)$; $L_{r,w}(t)$ denotes the safety lane changing spacing between $q_w^{r}(t)$ and $q_u^{r+1}(t)$; $L_{r,w+1}(t)$ denotes the safety lane changing spacing between $q_{w+1}^{r}(t)$ and $q_u^{r+1}(t)$; $v_{r,w}(t)$ denotes a speed of $q_w^{r}(t)$, $v_{r,w+1}(t)$ denotes a speed of $q_{w+1}^{r}(t)$, and $\Delta t_c$ denotes the duration of lane changing.

12, whether a count of vehicles $M_{r+1 \to 1}' \leq N_{r+1 \to r}(t)$ in the lane changing set $P_{r+1 \to r}(t)$ in the (r+1)th subregion within the influence region of the bus stop is valid may be determined. If the count of vehicles $M_{r+1 \to r}' \leq N_{r+1 \to r}(t)$ in the lane changing set $P_{r+1 \to r}(t)$ in the (r+1)th subregion within the influence region of the bus stop is valid, all the vehicles in the lane changing set $P_{r+1 \to r}(t)$ in the (r+1)th subregion may complete lane changing to the rth subregion; otherwise, a distance $d_{r+1,u}(t)$ between the vehicle $q_u^{r+1}(t)$ in the (r+1)th subregion and the previous vehicle $q_{u-1}^{r+1}(t)$ may be calculated by using an equation (13) to obtain distances between all the vehicles in the lane changing set $P_{r+1 \to r}(t)$ and the previous vehicles, and all the vehicles in the lane changing set $P_{r+1 \to r}(t)$ are arranged in an ascending order based on the distances between all the vehicles and the previous vehicles to select top $N_{r+1 \to r}(t)$ vehicles in the (r+1)th subregion with smallest spacings to fronts of the previous vehicles to complete lane changing to the rth subregion.

$$d_{r+1,u}(t) = x_{r+1,u-1}(t) - x_{r+1,u}(t) \quad (13)$$

Wherein $x_{r+1,u-1}(t)$ denotes a position horizontal coordinate of the previous vehicle $q_{u-1}^{r+1}(t)$ of $q_u^{r+1}(t)$ in the (r+1)th subregion.

13, whether $x_{bus}(t) < x_{Ldown}$ is valid may be determined. If $x_{bus}(t) < x_{Ldown}$ is valid, $t+\Delta t$ may be assigned to t and the process may return to the operation 4; otherwise, the control process may be ended, wherein $x_{bus}(t)$ denotes a position horizontal coordinate of the bus at the time t.

One or more embodiments of the present disclosure provide an electronic device comprising a storage device and a processor. The storage device may be configured to store programs for supporting the processor in executing the method for traffic flow control. The processor may be configured to execute the programs stored in the storage device.

One or more embodiments of the present disclosure provide a computer-readable storage medium comprising computer programs that, when executed by a processor, may direct the processor to execute the method for traffic flow control.

The beneficial effects of the embodiments of the present disclosure include, but are not limited to the following content. (1) The vehicles in the connected environment can obtain real-time information about the surrounding traffic, process and integrate the traffic information through the electronic device, calculate the lane changing pressures in different subregions within the influence region of the bus stop, and carry out the intelligent information exchange and intelligent decision making, so that the dynamic control of the driving state of the vehicles can be realized, which is conducive to improving the traffic efficiency of the road, thereby avoiding traffic congestion, avoiding some traffic accidents, and ensure safe driving of the vehicles. (2) The optimal count of lane changing vehicles of different subregions can be obtained by calculating the lane changing pressure differences in different subregions within the influence region of the bus stop, so as to complete lane changing between different subregions under the premise of meeting the safety lane changing spacings, achieving the balance of road traffic, and making full use of the existing road space resources, thereby saving the vehicle traveling time, and improving the efficiency of traffic flow. (3) The road traffic information can be updated in real time at a certain time interval, making lane changing more real-time and accurate, and a vehicle density distribution within the influence region of the bus stop can be dynamically regulated, improving the overall speed of the traffic flow within the influence region of the bus stop, thereby greatly improving the efficiency of the whole road.

BRIEF DESCRIPTION OF THE DRAWINGS

The present disclosure will be further illustrated by way of exemplary embodiments, which will be described in detail with reference to the accompanying drawings. These embodiments are not limiting, and in these embodiments, the same numbering denotes the same structure, wherein.

DETAILED DESCRIPTION

In order to more clearly illustrate the technical solutions of the embodiments of the present disclosure, the following briefly introduces the drawings that need to be used in the description of the embodiments. The accompanying drawings do not represent the entirety of the embodiments.

It should be understood that "system", "device", "unit" and/or "module" as used herein is a method for distinguishing different components, elements, parts, portions or assemblies of different levels. However, the words may be replaced by other expressions if other words can achieve the same purpose.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

Figure 1:
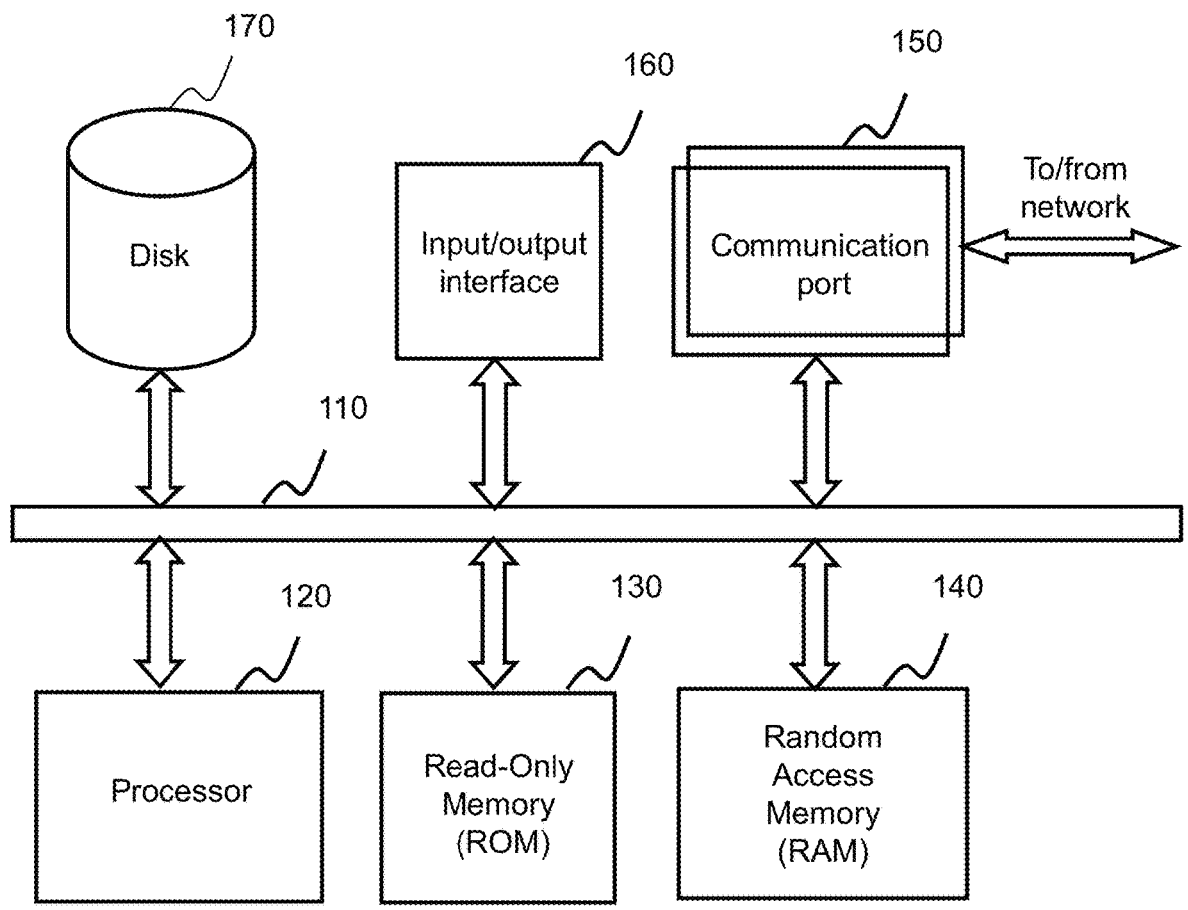
FIG. 1 is a schematic diagram illustrating exemplary hardware and software components of an exemplary electronic device according to some embodiments of the present disclosure.

FIG. 1 is a schematic diagram illustrating exemplary hardware and software components of an exemplary electronic device according to some embodiments of the present disclosure. An electronic device 100 may be configured to perform one or more of functions of various modules of a system for traffic flow control disclosed in the embodiments of the present disclosure. The system for traffic flow control is a system for implementing a method for traffic flow control considering a bus stop in a connected environment.

The electronic device 100 may be a general-purpose computer or a special-purpose computer, both of which may be used to implement a process for traffic flow control considering the bus stop in the connected environment. The electronic device 100 may include any component for implementing the process for traffic flow control considering the bus stop in the connected environment. For convenience, only one computer is shown in the figure, but the computer functionality described in the present disclosure with respect to search services may be implemented in a distributed manner across a plurality of similar platforms to spread the processing load.

The electronic device 100 may include a communication port 150 that is connected to and/or from a network to enable data communication. The electronic device 100 may also include a processor 120 in the form of one or more processors for executing program instructions. The processor 120 may be configured to process data from a storage device or an external data source (e.g., a speed measuring device). In some embodiments, the processor 120 may include a Central Processing Unit (CPU), an Application Specific Integrated Circuit (ASIC), an Application Specific Instruction set Processor (ASIP), or the like, or any combination thereof. The processor 120 may implement one or more functions on the electronic device 100 through hardware, software programs, firmware, or any combination thereof.

The electronic device 100 may include an internal communication bus 110, different types of program storage devices and data storage devices (e.g., a disk 170, a Read-Only Memory (ROM) 130, or a Random Access Memory (RAM) 140), and various data files processed and/or transmitted by a computer. For example, a computer platform may also include the program instructions executed by the processor 120 stored in the ROM 130, the RAM 140, and/or other forms of non-transitory storage media. Methods and/or processes provided by the embodiments of the present disclosure may be implemented as the program instructions.

The electronic device 100 may also include an input/output interface 160, which may support input/output between the computer and other components. The electronic device 100 may also receive programming and data via network communication.

The electronic device 100 may also include a hard disk controller in communication with a hard disk, a keypad/keyboard controller in communication with a keypad/keyboard, a serial interface controller in communication with a serial interface device, a parallel interface controller in communication with a parallel interface device, a display controller in communication with a display, or the like, or any combination thereof.

Merely by way of illustration, only one CPU and/or processor is exemplarily described in the electronic device 100. However, it should be noted that the electronic device 100 provided by the embodiments of the present disclosure may include a plurality of CPUs and/or processors, and thus operations and/or methods described in the embodiments of the present disclosure that are implemented by a single CPU and/or processor may also be implemented by the plurality of CPUs and/or processors, either jointly or independently. For example, if the CPU and/or processor of the electronic device 100 performs an operation A and an operation B in the embodiments of the present disclosure, it should be understood that the operation A and the operation B may also be performed jointly or independently by two different CPUs and/or processors in the electronic device 100 (e.g., a first processor performs the operation A, a second processor performs the operation B, or the first and second processors jointly perform the operation A and the operation B).

Figure 2:
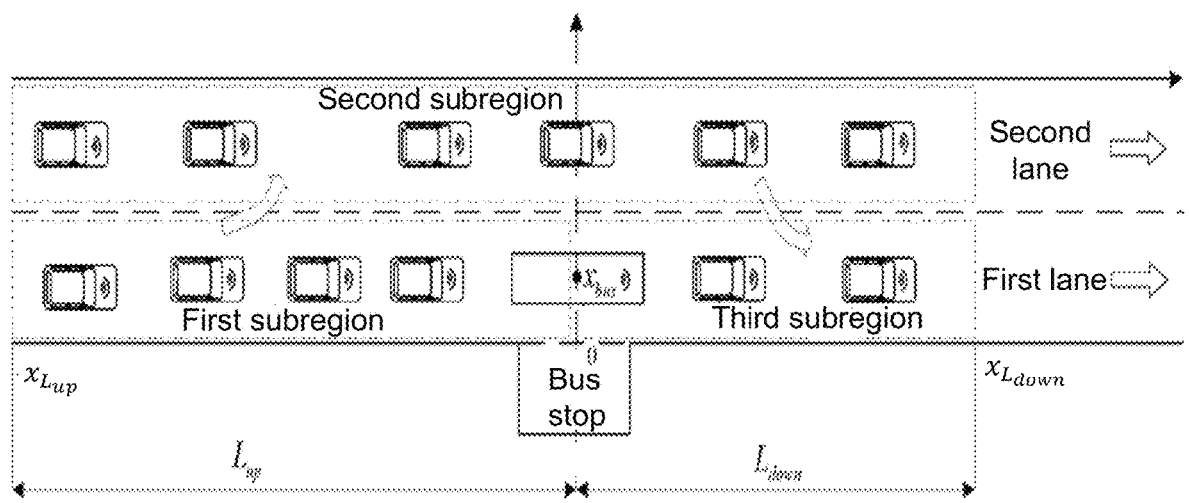
FIG. 2 is a schematic diagram illustrating exemplary connected and automated vehicles traveling in lanes according to some embodiments of the present disclosure.

FIG. 2 is a schematic diagram illustrating exemplary connected and automated vehicles traveling in lanes according to some embodiments of the present disclosure.

In some application scenarios, as illustrated in FIG. 2, the connected and automated vehicles may travel on a road with two lanes in one direction, and traveling directions of the connected and automated vehicles may be from left to right. The two lanes in one direction may include a first lane and a second lane. The first lane refers to a lane equipped with a bus stop. The second lane refers to another lane other than the first lane. For example, the second lane may be the other of the two lanes in one direction in addition to the first lane.

The connected and automated vehicles refer to automated vehicles that are connected. Connected means that the connected and automated vehicles are capable of communicating with each other, and interconnecting with an intelligent transportation device on the road to obtain real-time road information. The connected and automated vehicles may include a connected and automated car, a connected and automated vehicles bus, etc.

It is assumed that in the connected environment, the connected and automated bus (hereinafter referred to as a bus) may travel only in the first lane and complete the behavior of stopping toward the bus stop and leaving the bus stop in the first lane.

In some embodiments, a speed of the bus in the first lane may gradually decrease as the bus stops toward the bus stop, and an upstream vehicle may be influenced by the bus, which in turn makes a reduction in speed or lane changing behavior. If the upstream vehicle reduces the speed and continues to travel in the first lane, road congestion may be caused in the first lane. More descriptions regarding the upstream vehicle may be found in FIG. 3 and related descriptions thereof. If the upstream vehicle changes lane to travel in the second lane, normal traveling of vehicles in the second lane may be influenced. For example, when the vehicles in the second lane travel stably at a traffic flow speed, if the upstream vehicle in the first lane changes lane to the second lane, the vehicles in the second lane behind the upstream vehicle may reduce the speed under the influence of the upstream vehicle, which may cause road congestion in the second lane. In this case, vehicles in the second lane before the upstream vehicle may change lane to the first lane to relieve the congestion in the second lane.

In some embodiments, when the bus in the first lane leaves the bus stop, the speed of the bus may gradually increase until the bus resumes a uniform speed. A space available for traveling may appear behind the bus in the first lane. If there are too many upstream vehicles in the second lane, resulting in road congestion, the vehicles in the second lane may change to the first lane at this time to alleviate the congestion in the second lane.

In other application scenarios, the method for traffic flow control considering the bus stop in the connected environment may be applied to a road with three or more lanes in one direction. For example, if the connected and automate vehicles travel on the road with three lanes in one direction, the method for traffic flow control may only consider lane changing control of the vehicles in the first lane where the bus stop is provided and the second lane adjacent to the first lane.

Figure 3:
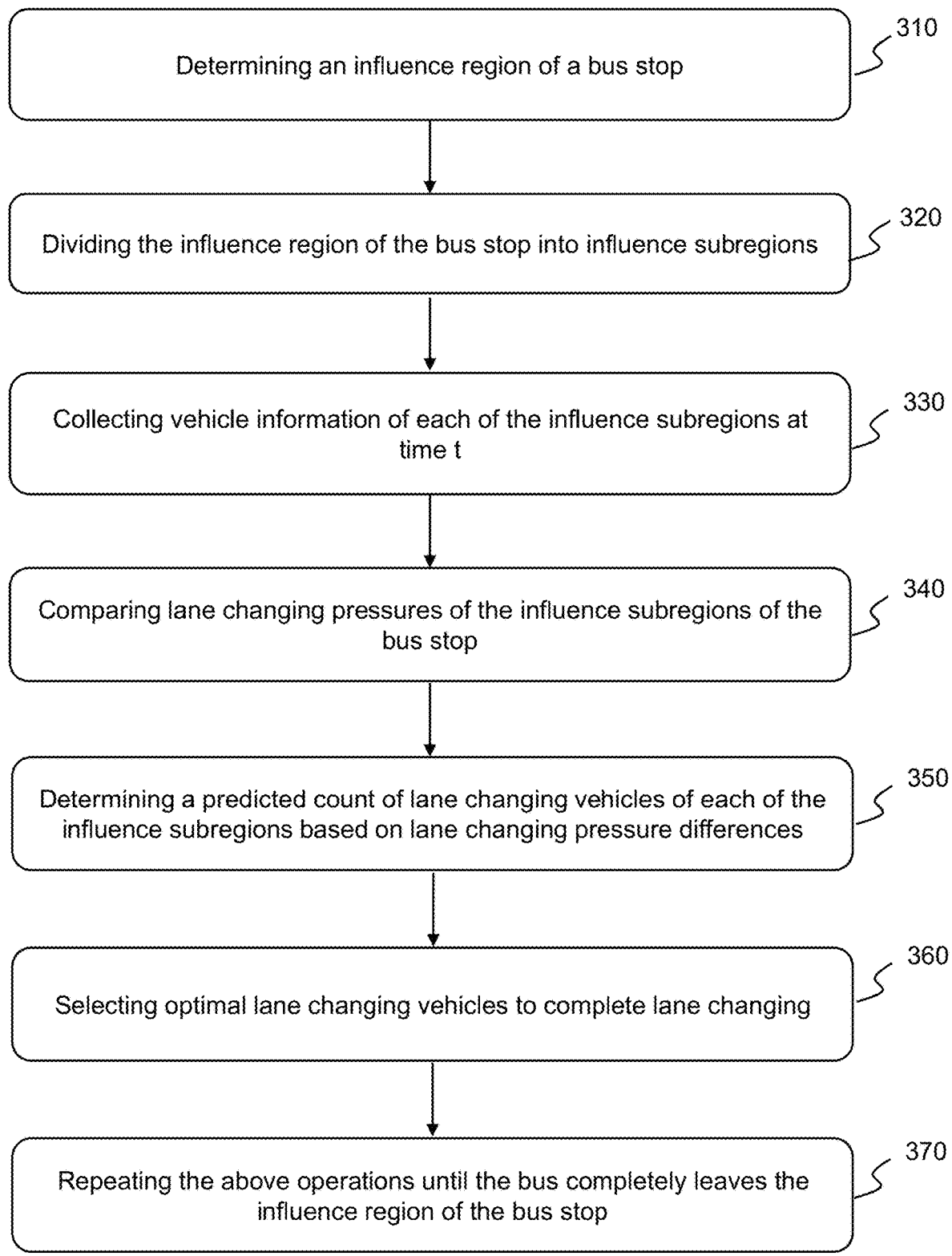
FIG. 3 is a flowchart illustrating an exemplary method for traffic flow control considering a bus stop in a connected environment according to some embodiments of the present disclosure.

FIG. 3 is a flowchart illustrating an exemplary method for traffic flow control considering a bus stop in a connected environment according to some embodiments of the present disclosure. In some embodiments, various operations of the method for traffic flow control considering the bus stop in the connected environment may be performed by a processor of an electronic device.

In 310, an influence region of a bus stop may be determined.

The influence region of the bus stop refers to a region where the bus influences normal traveling of other vehicles in a lane when the bus stops toward and leaves the bus stop. More descriptions may be found in FIG. 2 and related descriptions thereof.

In some embodiments, the processor may determine the influence region of the bus stop based on a length of the scope of the influence region of the bus stop and a width of the lane. For example, a rectangular region formed by the length of the influence region and the width of the lane may be taken as the influence region of the bus stop.

In some embodiments, when the bus travels in a first lane, the processor may detect whether the bus stops toward the bus stop and detect a speed of the bus based on a detection device provided on the bus. For example, the bus may be provided with the detection device such as a speed sensor, an acceleration sensor, an image collector, or the like. The detection device may communicate with the processor. The speed sensor may upload the speed of the bus to the processor. The image collector may take an image of a side of the bus and upload the image to the processor. If the speed sensor detects that the speed of the bus continues to decrease and the processor detects that the bus stop appears in the image of the side of the bus, it may be determined that the bus stops toward the bus stop.

In some embodiments, when the bus stops toward the bus stop, the processor may monitor a process of leaving the bus stop of the bus based on the detection devices provided on the bus. For example, when the processor determines that the bus stops at the bus stop, the speed sensor detects that the speed of the bus continues to increase and the bus stop disappears from the image of the side of the bus, the processor may determine that the bus leaves the bus stop.

In some embodiments, in response to determining that the bus stops toward the bus stop and the speed of the bus is lower than the traffic flow speed, the processor may obtain, based on the detection device provided on the bus, a distance traveled by an upstream vehicle under the influence of the bus as a first distance; in a process of leaving the bus stop of the bus and the speed of the bus accelerates to the traffic flow speed, the processor may detect, based on the detection device provided on the bus, a distance traveled by the bus as a second distance; and the processor may take a sum of the first distance and the second distance as a length L of the influence region of the bus stop.

The traffic flow speed characterizes an overall speed of a plurality of vehicles in two lanes in one direction. In some embodiments, the traffic flow speed may include, for example, an average of the speeds of the plurality of vehicles. In some embodiments, the processor may calculate the average of the speeds of the plurality of vehicles, and determine the average as the traffic flow speed. The speeds of the plurality of vehicles on the road may be obtained by speed sensors provided in the plurality of vehicles and uploaded to the processor by controllers of the plurality of vehicles. In some embodiments, the processor may obtain the speeds of the plurality of vehicles on the road by a speed measurement device on the road.

In some embodiments, the processor may calculate the length L of the influence region of the bus stop based on the first distance and the second distance by using an equation (1).

$$L = L_{up} + L_{down} \quad (1)$$

Wherein $L_{up}$ denotes an influence distance of the bus on traveling of the upstream vehicle in a process of decelerating and stopping at the bus stop to resuming a uniform speed, i.e., an after-effect influence distance (e.g., the first distance) of the bus; and $L_{down}$ denotes a distance traveled by the bus in a process of leaving the bus stop to the uniform speed, i.e., a downstream influence distance (e.g., the second distance) of the bus.

In some embodiments, $L_{up}$ may be calculated by the following equation (2):

$$L_{up} = (v_f - v_s) \frac{v_f \cdot \eta_1}{(1 - \eta_1)v_f - v_s} t_d \quad (2)$$

Wherein $v_f$ denotes a free flow speed on the road with two lanes in one direction, and $v_s$ denotes a starting speed of the bus; $\eta_1$ denotes a standardized density of road traffic when the bus does not decelerate; and $t_d$ denotes a predicted stop time of the bus.

The free flow speed refers to a traffic flow speed when vehicles on the road are not disturbed.

The starting speed of the bus refers to a speed of the bus in a preset time after the bus is started. In some embodiments, the processor may obtain the starting speed of the bus based on the detection devices provided on the bus.

The standardized density refers to a traffic density obtained by standardization of the traffic density of road traffic flow. The traffic density may reflect a density of vehicles on the road.

In some embodiments, the processor may determine the traffic density in various ways. For example, the processor may calculate a ratio of a count of vehicles per unit distance to the unit distance, and determine the ratio as the traffic density. As another example, the processor may obtain a road image through a camera installed on a roadside, and obtain the traffic density based on the road image through an image recognition algorithm, or the like. The image recognition algorithm may include a support vector machine method, principal component analysis, an image segmentation algorithm, or the like. The unit distance may be preset, such as one hundred meters.

In some embodiments, the standardization refers to mapping the traffic density to a preset range. The preset range may be preset, such as 0-1. The standardization may map the traffic density to a number within a range of 0-1. The larger the number, the higher the traffic density. A number 0 indicates that there are no vehicles on the road, and a number 1 indicates that congestion occurs on the road, at which time the traffic density maximum.

In some embodiments, the standardized density $\eta_1$ of the road traffic when the bus does not decelerate may be calculated by the following equation (3):

$$\eta_1 = \frac{k_1}{k_e} \quad (3)$$

Wherein $k_1$ denotes the traffic density of the road traffic when the bus does not decelerate, and $k_e$ denotes a traffic density when congestion occurs on the road with two lanes in one direction.

The predicted stop time refers to an amount of time the bus is expected to stop at the bus stop. In some embodiments, the processor may determine the predicted stop time in various ways. For example, the processor may calculate an average of a plurality of historical stop times based on the plurality of historical stop times of the bus, and determine the average as the predicted stop time.

The historical stop times refer to times in historical data when the bus stops at the same stop. In some embodiments, the processor may obtain the historical stop times through a storage device.

In some embodiments, the predicted stop time ta of the bus may be calculated by the following equation (4):

$$t_d = a_1 t_{d-1} + a_2 t_{d-2} + \ldots + a_p t_{d-p} + \varepsilon_d + \beta_1 \varepsilon_{d-1} + \ldots + \beta_q \varepsilon_{d-q} \quad (4)$$

Wherein $a_1, a_2, \ldots a_p$ denote p regression coefficients; $\beta_1, \ldots \beta_q$ denote q sliding coefficients; $t_{d-1}, t_{d-2}, \ldots t_{d-p}$ denote p historical stop times of the bus, and $\varepsilon_d, \varepsilon_{d-1}, \ldots \varepsilon_{d-q}$ denote q+1 white noise sequences. The regression coefficients refer to relationships between the historical stop times and the predicted stop time. The sliding coefficients refer to relationships between the white noise sequences and the predicted stop time. The white noise sequences refer to differences between the historical stop times and the predicted stop time. The white noise sequences, the regression coefficients, and the sliding coefficients may be preset based on a plurality of experiments.

In some embodiments, $L_{down}$ may be calculated by the following equation (5):

$$L_{down} = \frac{v_b^2}{2a_g} \quad (5)$$

Wherein $v_b$ denotes a speed at which the bus resumes the uniform speed after leaving the bus stop, and $a_g$ denotes acceleration of the bus. In some embodiments, the processor may obtain $v_g$ and $a_g$ based on the detection device provided on the bus.

In some embodiments, the processor may take a rectangular region formed by the length L of the influence region and the width of the road with two lanes in one direction as the influence region.

In 320, the influence region of the bus stop may be divided into subregions.

Figure 4:
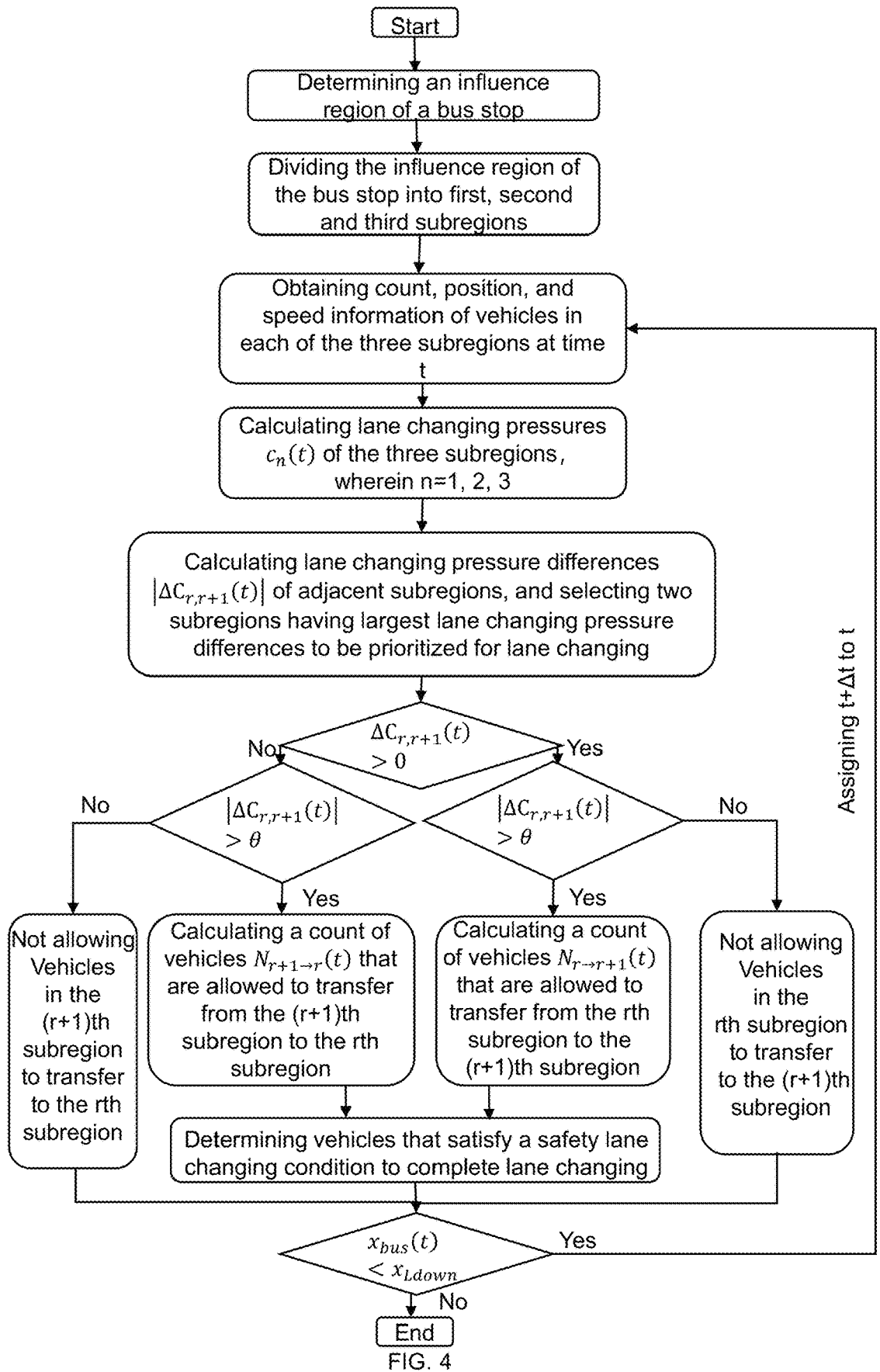
FIG. 4 is a flowchart illustrating an exemplary decision-making method of a method for traffic flow control considering a bus stop in a connected environment according to some embodiments of the present disclosure.

As illustrated in FIG. 2 and FIG. 4, in some embodiments, the processor may take the bus stop as an origin of the influence region, a traveling direction of the bus as a positive direction of an x-axis, an x-axis horizontal coordinate of a distance $L_{up}$ between the origin and an upstream road section as $x_{L_{up}}$, and an x-axis horizontal coordinate of a distance $L_{down}$ between the origin and a downstream road section as $x_{L_{down}}$, thereby dividing the influence region into three subregions.

A first subregion refers a rectangular region in the first lane with a central position of the bus as a start point and the $x_{L_{up}}$ as an end point.

A second subregion refers to rectangular region in a second lane with the $x_{L_{down}}$ as a start point and the $x_{L_{down}}$ as an end point.

A third subregion refers to a rectangular region in the first lane with the central position of the bus as a start point and the $x_{L_{down}}$ as an end point.

An upstream road refers a road that extends in a direction opposite to the traveling direction of vehicles, and a downstream road refers to a road that extends in a direction of the traveling direction of vehicles. Taking FIG. 3 as an example, if the traveling direction of vehicles is from left to right, the road to the left of the origin may be the upstream road, and the road to the right of the origin may be the downstream road. A road section refers to a section perpendicular to a direction of a road centerline.

In 330, vehicle information of the influence subregions at a time t may be collected.

In some embodiments, connected and automated vehicles may sense changes in the surrounding traffic environment and receive control from a roadside intelligent device. As illustrated in FIG. 4, the processor may obtain vehicle information such as a vehicle position, a vehicle speed, vehicle acceleration, or the like, in each of the subregions within the influence region of the bus stop at the time t based on an intelligent connected roadside facility.

The roadside intelligent device refers to a device configured to undertake communication between the road and vehicle, such as a roadside intelligent parking device, an intelligent traffic signal controller, or the like.

The intelligent connected roadside facility refers to a roadside facility capable of communicating with the connected and automated vehicles, such as an environmental monitoring device, a camera, a lidar, a millimeter wave radar, or the like. The environmental monitoring device may be configured to detect road surroundings. The camera may be configured to capture an image related to the road. The lidar and the millimeter wave radar may be configured to detect positions and speeds of objects around the road, etc.

In 340, lane changing pressures of the influence subregions of the bus stop may be compared.

The lane changing pressures are used to reflect how difficult it is for the vehicles to change from a current lane to another lane. The lane changing pressures may include a density pressure and a speed pressure. The density pressure refers to a lane changing pressure caused by the traffic density, and the speed pressure refers to a lane changing pressure caused by the traffic flow speed.

As illustrated in FIG. 4, in some embodiments, the processor may calculate lane changing pressures $c_n(t)$ of a first subregion, a second subregion, and a third subregion, wherein n=1, 2, 3.

In some embodiments, the processor may calculate a lane changing pressure of an nth subregion at the time t by using an equation (6), wherein n=1, 2, 3.

$$\begin{cases} c_n(t) = K_{n,pre}(t) + v_{n,pre}(t) \\ K_{n,pre}(t) = \frac{\lambda_1(k_n(t) - k_m)}{k_m} \Delta t \\ v_{n,pre}(t) = \frac{\lambda_2(v_f - \overline{v_n}(t))}{v_f} \Delta t \end{cases} \quad (6)$$

Wherein $c_n(t)$ denotes the lane changing pressure of the nth subregion at the time t, $K_{n,pre}(t)$ denotes the density pressure of the nth subregion at the time t, and $v_{n,pre}(t)$ denotes the speed pressure of the nth subregion at the time t; $\lambda_1$ and $\lambda_2$ denote regulation parameters, $k_n(t)$ denotes a traffic density of the nth subregion at the time t, and $k_m$ denotes a traffic density of a maximum traffic volume when the vehicles travel normally on the road with two lanes in one direction; $\overline{v_n}(t)$ denotes an average speed of all the vehicles in the nth subregion at the time t; and $\Delta t$ denotes a time interval.

The traffic volume refers to a count of vehicles passing through a certain road section in a certain time period. For example, the traffic volume may be 10 vehicles/min. The processor may determine the traffic volume based on the image captured by the camera through an image recognition algorithm. The camera may upload the captured images to the processor. The camera may be provided on the vehicles or in a road network.

In 350, a predicted count of lane changing vehicles of the influence subregions may be determined based on lane changing pressure differences.

The lane changing pressure differences refer to differences between the lane changing pressures of two influence subregions.

The predicted count of lane changing vehicles refers to a predicted count of vehicles performing lane changing between different subregions.

In some embodiments, the predicted count of lane changing vehicles may include a first count of lane changing vehicles that change lane from the first subregion to the second subregion and a second count of lane changing vehicles that change lane from the second subregion to the third subregion; a third count of lane changing vehicles that change lane from the second subregion to the first subregion, and a fourth count of lane changing vehicles that change lane from the third subregion to the second subregion.

As illustrated in FIG. 4, in some embodiments, the processor may calculate the lane changing pressure differences $\Delta C_{r,r+1}(t)$ of adjacent subregions to select two subregions having largest lane changing pressure differences to be prioritized for lane changing.

In some embodiments, the processor may calculate a lane changing pressure difference $\Delta C_{r,r+1}(t)$ between an rth subregion and an (r+1)th subregion at the time t by using an equation (7), thereby obtaining lane changing pressure differences $\{\Delta C_{r,r+1}(t)|r=1,2\}$ of all the subregions.

$$\Delta C_{r,r+1}(t) = c_r(t) - c_{r+1}(t) \quad (7)$$

Wherein $c_r(t)$ denotes the lane changing pressure of the rth subregion at the time t, $c_{r+1}(t)$ denotes the lane changing pressure of the (r+1)th subregion at the time t, and r=1, 2.

In 360, an optimal lane changing vehicle may be selected to complete lane changing.

As illustrated in FIG. 4, in some embodiments, the processor may select the two subregions with the largest lane changing pressure differences from $\{\Delta C_{r,r+1}(t)|r=1,2\}$ to be prioritized for lane changing. In some embodiments, the processor may determine whether the vehicles can be controlled for lane changing based on a relationship between the lane changing pressure $c_r(t)$ of the rth subregion and the lane changing pressure $c_{r+1}(t)$ of the (r+1)th subregion at the time t, and absolute values $|\Delta C_{r,r+1}(t)|$ of the lane changing pressure differences. In response to determining that the vehicles can be controlled for lane changing, the processor may further determine, based on the absolute values $|\Delta C_{r,r+1}(t)|$ of the lane changing pressure differences and a lane changing threshold, a count of vehicles in the rth subregion that are allowed to transfer to the (r+1)th subregion, and/or a count of vehicles in the (r+1)th subregion that are allowed to transfer to the rth subregion. More descriptions of the embodiments may be found in operations 361-365.

In 361, whether $\Delta C_{r,r+1}(t)>0$ is valid may be determined. If $\Delta C_{r,r+1}(t)>0$ is valid, operation 362 may be performed; otherwise, operation 363 may be performed.

In 362, whether $|\Delta C_{r,r+1}(t)|>\theta$ is valid may be determined. If $|\Delta C_{r,r+1}(t)|>\theta$ is valid, operation 363 may be performed; otherwise, lane changing of the vehicles within the influence region of the bus stop may be prohibited, and operation 370 may be performed; wherein $\theta$ denotes the lane changing threshold and is a constant. The lane changing threshold refers to data for determining whether lane changing is performed. In some embodiments, the lane changing threshold may be preset based on experimental data. It should be understood that by determining whether the lane changing pressure differences are greater than the lane changing threshold, and thus further determining whether lane changing is performed, the method for control can be more stable, and frequent lane changing of the vehicles can be avoided.

In 363, a count of vehicles $N_{r \to r+1}(t)$ that are allowed to transfer from the rth subregion to the (r+1)th subregion may be calculated.

In some embodiments, the processor may calculate the count of vehicles $N_{r \to r+1}(t)$ (including the first count of lane changing vehicles and/or the second count of lane changing vehicles) that are allowed to transfer from the rth subregion to the (r+1)th subregion by using an equation (8):

$$\left(\frac{\lambda_1}{k_m} + \frac{\lambda_2}{v_f k_e}\right)\left(\frac{N_r(t) - N_{r \to r+1}(t)}{L_r(t)} - \frac{N_{r+1}(t) + N_{r \to r+1}(t)}{L_{r+1}(t)}\right) = \theta \quad (8)$$

Wherein $N_r(t)$ denotes a count of vehicles in the rth subregion at the time t, and $L_r(t)$ denotes a length of the rth subregion at the time t; $N_{r+1}(t)$ denotes a count of vehicles in the (r+1)th subregion at the time t, and $L_{r+1}(t)$ denotes a length of the (r+1)th subregion at the time t. In some embodiments, the processor may determine the count of vehicles in different subregions based on the image captured by the camera through the image recognition algorithm.

As illustrated in FIG. 4, after the count of vehicles $N_{r \to r+1}(t)$ that are allowed to transfer from the rth subregion to the (r+1)th subregion is determined, the processor may determine vehicles in the rth subregion that satisfy a safety lane changing condition to complete lane changing.

In some embodiments, the safety lane changing condition may include that a distance between front and rear vehicles in adjacent lanes meets a safety spacing requirement for lane changing of the connected and automated vehicles.

In some embodiments, the processor may denote an ith vehicle in the rth subregion within the influence region of the bus stop at the time t as $q_i^r(t)$, a previous vehicle of the ith vehicle $q_i^r(t)$ in the rth subregion as $q_{i-1}^r(t)$, a next vehicle in the (r+1)th subregion relative to the ith vehicle $q_i^r(t)$ in the rth subregion as $q_{j+1}^{r+1}(t)$, and a previous vehicle in the (r+1)th subregion relative to the ith vehicle $q_i^r(t)$ in the rth subregion as $q_j^{r+1}(t)$.

The safety spacing requirement refers to a distance requirement that needs to be met to enable the vehicles to perform safe lane changing. For example, the safety spacing requirement may include that a distance between $q_i^r(t)$ and $q_{j+1}^{r+1}(t)$ exceeds a set safety lane changing spacing, and a distance between $q_i^r(t)$ and $q_j^{r+1}(t)$ exceeds the set safety lane changing spacing. The safety lane changing spacing refers to a minimum distance between two vehicles under which the two vehicles can perform safe lane changing. In some embodiments, the safety lane changing spacing may be preset based on historical data or prior knowledge.

In some embodiments, the processor may determine whether the ith vehicle $q_i^r(t)$ in the rth subregion at the time t satisfies the safety lane changing condition in an equation (9). If the ith vehicle $q_i^r(t)$ in the rth subregion at the time t satisfies the safety lane changing condition in the equation (9), the ith vehicle $q_i^r(t)$ may be added to a lane changing set $P_{r \to r+1}(t)$; otherwise, it is indicated that the ith vehicle $q_i^r(t)$ cannot be transferred to the (r+1)th subregion at the safety lane changing spacing, and the ith vehicle $q_i^r(t)$ continues to travel in the rth subregion, thereby obtaining the lane changing set $P_{r \to r+1}(t)$.

$$\begin{cases} x_{r+1,j}(t) - x_{r,i}(t) \geq L_{r+1,j}(t) \\ x_{r,i}(t) - x_{r+1,j+1}(t) \geq L_{r+1,j+1}(t) \\ L_{r+1,j}(t) = \frac{v_{r+1,j}(t) \cdot \Delta t_c}{3} + 10 - l_{veh} \\ L_{r+1,j+1}(t) = \frac{v_{r+1,j+1}(t) \cdot \Delta t_c}{3} + 10 - l_{veh} \end{cases} \quad (9)$$

Wherein $x_{r+1,j}(t)$ denotes a position horizontal coordinate of $q_j^{r+1}(t)$; $x_{r,i}(t)$ denotes a position horizontal coordinate of $q_i^r(t)$; $x_{r+1,j+1}(t)$ denotes a position horizontal coordinate of $q_{j+1}^{r+1}(t)$; $L_{r+1,j}(t)$ denotes the safety lane changing spacing between $q_i^r(t)$ and $q_j^{r+1}(t)$; $L_{r+1,j+1}(t)$ denotes the safety lane changing spacing between $q_i^r(t)$ and $q_{j+1}^{r+1}(t)$; $v_{r+1,j}(t)$ denotes a speed of $q_j^{r+1}(t)$, and $v_{r+1,j+1}(t)$ denotes a speed of $q_{j+1}^{r+1}(t)$; $l_{veh}$ denotes a length of a vehicle body; and $\Delta t$ denotes a duration of lane changing.

The lane changing set $P_{r \to r+1}(t)$ refers to a set of vehicles capable of changing lane from the rth subregion to the (r+1)th subregion.

In some embodiments, the processor may determine whether a count of vehicles $M_{r \to r+1}{}^t \leq N_{r \to r+1}(t)$ in the lane changing set $P_{r \to r+1}(t)$ in the rth subregion within the influence region of the bus stop is valid. If the count of vehicles $M_{r \to r+1}{}^t \leq N_{r \to r+1}(t)$ in the lane changing set $P_{r \to r+1}(t)$ in the rth subregion within the influence region of the bus stop is valid, all the vehicles in the lane changing set $P_{r \to r+1}(t)$ in the rth subregion may be controlled to complete lane changing to the (r+1)th subregion, and operation 370 may be performed; otherwise, the processor may calculate a distance $d_{r,i}(t)$ between a vehicle $q_i^r(t)$ in the rth subregion and a previous vehicle $q_{i-1}^r(t)$ by using an equation (10) to obtain distances between all the vehicles in the lane changing set $P_{r \to r+1}(t)$ and the previous vehicles, and arrange all the vehicles in the lane changing set $P_{r \to r+1}(t)$ in an ascending order based on the distances between all the vehicles and the previous vehicles to select top $N_{r \to r+1}(t)$ vehicles in the rth subregion with smallest spacings to fronts of the previous vehicles to complete lane changing to the (r+1)th subregion, and perform the operation 370.

$$d_{r,i}(t) = x_{r,i-1}(t) - x_{r,i-1}(t) \quad (10)$$

Wherein $x_{r,i-1}(t)$ denotes a position horizontal coordinate of the previous vehicle $q_{i-1}^r(t)$ of the vehicle $q_i^r(t)$ in the rth subregion.

In 364, whether $|\Delta C_{r,r+1}(t)| > \theta$ is valid may be determined. If $|\Delta C_{r,r+1}(t)| > \theta$ is valid, operation 365 may be performed; otherwise, the the vehicles within the influence region of the bus stop may not be allowed to change lanes, and operation 370 may be performed.

In 365, a count of vehicles $N_{r+1 \to r}(t)$ that are allowed to transfer from the (r+1)th subregion to the rth subregion may be calculated.

In some embodiments, the processor may calculate the count of vehicles (including a third count of lane changing vehicles and/or a fourth count of lane changing vehicles) $N_{r+1 \to r}(t)$ that are allowed to transfer from the (r+1)th subregion to the rth subregion by using an equation (11).

$$\left(\frac{\lambda_1}{k_m} + \frac{\lambda_2}{v_f k_e}\right)\left(\frac{N_{r+1}(t) - N_{r+1 \to r}(t)}{L_{r+1}(t)} - \frac{N_r(t) + N_{r+1 \to r}(t)}{L_r(t)}\right) = \theta \quad (11)$$

As illustrated in FIG. 4, after the count of vehicles $N_{r+1 \to r}(t)$ that are allowed to transfer from the (r+1)th subregion to the rth subregion is determined, the processor may determine the vehicles in the (r+1)th subregion that satisfy the safety lane changing condition to complete lane changing.

In some embodiments, the processor may denote a uth vehicle in the (r+1)th subregion within the influence region of the bus stop at the time t as $q_u^{r+1}(t)$, a previous vehicle in the (r+1)th subregion relative to the uth vehicle $q_u^{r+1}(t)$ as $q_{u-1}^{r+1}(t)$, a latter vehicle in the rth region relative to the uth vehicle $q_u^{r+1}(t)$ in the (r+1)th subregion as $q_{w+1}^r(t)$, and a previous vehicle in the rth subregion relative to the uth vehicle $q_u^{r+1}(t)$ in the (r+1)th subregion as $q_w^r(t)$.

In some embodiments, the processor may determine whether the uth vehicle $q_u^{r+1}(t)$ in the (r+1)th subregion at the time t satisfies a safety lane changing condition shown in an equation (12). If the uth vehicle $q_u^{r+1}(t)$ in the (r+1)th subregion at the time t satisfies the safety lane changing condition shown in the equation (12), the uth vehicle $q_u^{r+1}(t)$ may be added to a lane changing set $P_{r+1 \to r}(t)$; otherwise, it is indicated that the uth vehicle $q_u^{r+1}(t)$ cannot be transferred to the rth subregion at the safety lane change spacing, and the uth vehicle $q_u^{r+1}(t)$ continues to travel in the (r+1)th subregion, thereby obtaining the lane changing set $P_{r+1 \to r}(t)$.

$$\begin{cases} x_{r,w}(t) - x_{r+1,u}(t) \geq L_{r,w}(t) \\ x_{r+1,u}(t) - x_{r,w+1}(t) \geq L_{r,w+1}(t) \\ L_{r,w}(t) = \dfrac{v_{r,w}(t) \cdot \Delta t_c}{3} + 10 - l_{veh} \\ L_{r,w+1}(t) = \dfrac{v_{r,w+1}(t) \cdot \Delta t_c}{3} + 10 - l_{veh} \end{cases} \quad (12)$$

Wherein $x_{r,w}(t)$ denotes a position horizontal coordinate of $q_w^r(t)$; $x_{r+1,u}(t)$ denotes a position horizontal coordinate of $q_u^{r+1}(t)$; $x_{r,w+1}(t)$ denotes a position horizontal coordinate of $q_{w+1}^r(t)$; $L_{r,w}(t)$ denotes the safety lane changing spacing between $q_w^r(t)$ and $q_u^{r+1}(t)$; $L_{r,w+1}(t)$ denotes the safety lane changing spacing between $q_{w+1}^r(t)$ and $q_u^{r+1}(t)$; $v_{r,w}(t)$ denotes a speed of $q_w^r(t)$, $v_{r,w+1}(t)$ denotes a speed of $q_{w+1}^r(t)$, and $\Delta t_c$ denotes the duration of lane changing.

The lane changing set $P_{r+1 \to r}(t)$ refers to a set of vehicles capable of changing lanes from the (r+1)th subregion to the rth subregion.

In some embodiments, the processor may determine whether a count of vehicles $M_{r+1 \to r}' \leq N_{r+1 \to r}(t)$ in the lane changing set $P_{r+1 \to r}(t)$ in the (r+1)th subregion within the influence region of the bus stop is valid. If the count of vehicles $M_{r+1 \to r}' \leq N_{r+1 \to r}(t)$ in the lane changing set $P_{r+1 \to r}(t)$ in the (r+1)th subregion within the influence region of the bus stop is valid, all the vehicles in the lane changing set $P_{r+1 \to r}(t)$ in the (r+1)th subregion may complete lane changing to the rth subregion, and operation 370 may be performed; otherwise, the processor may calculate a distance $d_{r+1,u}(t)$ between the vehicle $q_u^{r+1}(t)$ in the (r+1)th subregion and the previous vehicle $q_{u-1}^{r+1}(t)$ by using an equation (13) to obtain distances between all the vehicles in the lane changing set $P_{r+1 \to r}(t)$ and the previous vehicles, and arrange all the vehicles in the lane changing set $P_{r+1 \to r}(t)$ in an ascending order based on the distances between all the vehicles and the previous vehicles to select top $N_{r+1 \to r}(t)$ vehicles in the (r+1)th subregion with smallest spacings to fronts of the previous vehicles to complete lane changing to the rth subregion, and perform the operation 370.

$$d_{r+1,u}(t) = x_{r+1,u-1}(t) - x_{r+1,u}(t) \quad (13)$$

Wherein $x_{r+1,u-1}(t)$ denotes a position horizontal coordinate of the previous vehicle $q_{u-1}^{r+1}(t)$ of $q_u^{r+1}(t)$ in the (r+1)th subregion.

In 370, the above operations may be repeated until the bus is completely out of the influence region of the bus stop.

In some embodiments, the processor may determine whether the bus is completely out of the influence region of the bus stop based on a position horizontal coordinate of the bus at the time t and $x_{Ldown}$. For example, as illustrated in FIG. 4, the processor may determine whether $x_{bus}(t) < x_{Ldown}$ is valid. If $x_{bus}(t) < x_{Ldown}$ is valid, $t + \Delta t$ may be assigned to t and the process may return to the operation 4; otherwise, the control process may be ended, wherein $x_{bus}(t)$ denotes the position horizontal coordinate of the bus at the time t.

It should be noted that all the above processes for determining the relevant data using the equations are performed by the processor. For example, the equations may be stored in the storage device in advance in the form of program instructions. The processor may retrieve the relevant program instructions from the storage device to implement the methods and/or processes provided by the embodiments of the present disclosure.

In some embodiments of the present disclosure, the method for traffic flow control considering the bus stop in the connected environment is not limited to traffic flow control considering the bus stop in the two lanes in one direction, and other embodiments obtained by a person of ordinary skill in the art without creative changes fall within the scope of protection of the present disclosure.

In addition, certain features, structures, or characteristics of one or more embodiments of the present disclosure may be suitably combined.

In some embodiments, counts describing the quantity of components and attributes are used. It should be understood that such counts used in the description of the embodiments use the modifiers "about", "approximately" or "substantially" in some examples. Unless otherwise stated, "about", "approximately" or "substantially" indicates that the stated figure allows for a variation of ±20%. Accordingly, in some embodiments, the numerical parameters used in the disclosure and claims are approximations that can vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

By way of example, should there be any inconsistency or conflict between the description, definition, and/or the use of a term associated with any of the incorporated material and that associated with the present document, the description, definition, and/or the use of the term in the present document shall prevail.

What is claimed is:

1. A method for traffic flow control considering a bus stop in a connected environment, wherein the method is applied to a road with two lanes in one direction and a bus stop is provided in a first lane, and the method comprises the following operations;

1, when a bus travels in the first lane, a sum of a distance traveled by an upstream vehicle under the influence of a bus when the bus is in a process of stopping toward the bus stop and a speed of the bus is lower than a traffic flow speed is taken as a first distance; and a distance traveled by the bus when the bus is in a process of leaving the bus stop and the speed of the bus accelerates to the traffic flow speed is taken as a second distance; and a sum of the first distance and the second distance is taken as a length L of an influence region of the bus stop;

2, the length L of the influence region of the bus stop is calculated by using an equation (1);

$$L = L_{up} + L_{down} \quad (1)$$

wherein $L_{up}$ denotes an influence distance of the bus on traveling of the upstream vehicle in a process of decelerating and stopping at the bus stop to resuming a uniform speed, i.e., an after-effect influence distance of the bus, and is obtained by an equation (2); and $L_{down}$ denotes a distance traveled by the bus in a process of leaving the bus stop to the uniform speed, i.e., a downstream influence distance of the bus, and is obtained by an equation (5);

$$L_{up} = (v_f - v_s)\frac{v_f \cdot \eta_1}{(1-\eta_1)v_f - v_s}t_d \quad (2)$$

wherein $v_f$ denotes a free flow speed on the road with two lanes in one direction, and $v_s$ denotes a starting speed of the bus; $\eta_1$ denotes a standardized density of road traffic when the bus does not decelerate and is obtained by an equation (3); and $t_d$ denotes a predicted stop time of the bus and is obtained by an equation (4);

$$\eta_1 = \frac{k_1}{k_e} \quad (3)$$

$$t_d = a_1 t_{d-1} + a_2 t_{d-2} + \ldots + a_p t_{d-p} + \varepsilon_d + \beta_1 \varepsilon_{d-1} + \ldots + \beta_q \varepsilon_{d-q} \quad (4)$$

in the equation (3), $k_1$ denotes a traffic density of the road traffic when the bus does not decelerate, and $k_e$ denotes a traffic density when congestion occurs on the road with two lanes in one direction;

in the equation (4), $a_1, a_2, \ldots a_p$ denote p regression coefficients, $\beta_1, \ldots \beta_q$ denote q sliding coefficients; $t_{d-1}, t_{d-2}, \ldots t_{d-p}$ denote p historical stop times of the bus, and $\varepsilon_d, \varepsilon_{d-1}, \ldots \varepsilon_{d-q}$ denote q white noise sequences;

$$L_{down} = \frac{v_b^2}{2a_g} \quad (5)$$

wherein $v_b$ denotes a speed at which the bus resumes the uniform speed after leaving the bus stop, and $a_g$ denotes acceleration of the bus;

3, a rectangular region formed by the length L of the influence region and a width of the road with two lanes in one direction is taken as the influence region, the bus stop is taken as an origin of the influence region, a traveling direction of the bus is taken as a positive direction of an x-axis, an x-axis horizontal coordinate of a distance $L_{up}$ between the origin and an upstream road section as $x_{L_{up}}$, and an x-axis horizontal coordinate of a distance $L_{down}$ between the origin and a downstream road section is taken as $x_{L_{down}}$, thereby dividing the influence region into three subregions;

wherein a first subregion is a rectangular region in the first lane with a central position of the bus as a start point and the $x_{L_{down}}$ as an end point;

a second subregion is a rectangular region in the first lane with the central position of the bus as a start point and the $x_{L_{down}}$ as an end point;

a third subregion is a rectangular region in a second lane with the $x_{L_{up}}$ as a start point and the $x_{L_{down}}$ as an end point is;

4, a vehicle position, a vehicle speed, and vehicle acceleration in each of the three subregions within the influence region of the bus stop at time t are obtained using an intelligent connected roadside facility;

5, a lane changing pressure of an nth subregion at the time t is calculated using an equation (6), wherein n=1, 2, 3;

$$\begin{cases} c_n(t) = K_{n,pre}(t) + v_{n,pre}(t) \\ K_{n,pre}(t) = \frac{\lambda_1(k_n(t) - k_m)}{k_m}\Delta t \\ v_{n,pre}(t) = \frac{\lambda_2(v_f - \bar{v}_n(t))}{v_f}\Delta t \end{cases} \quad (6)$$

wherein $c_n(t)$ denotes the lane changing pressure of the nth subregion at the time t, $K_{n,pre}(t)$ denotes a density pressure of the nth subregion at the time t, and $v_{n,pre}(t)$ denotes a speed pressure of the nth subregion at the time t; $\lambda_1$ and $\lambda_2$ denote regulation parameters, $k_n(t)$ denotes a traffic density of the nth subregion at the time t, and $k_m$ denotes a traffic density of a maximum traffic volume when vehicles travel normally on the road with two lanes in one direction; $\bar{v}_n(t)$ denotes an average speed of all vehicles in the nth subregion at the time t; and $\Delta t$ denotes a time interval;

6, a lane changing pressure difference $\Delta C_{r,r+1}(t)$ between an rth subregion at the time t and an (r+1)th subregion at the time t is calculated by using an equation (7), thereby obtaining lane changing pressure differences $\{\Delta C_{r,r+1}(t)|r=1,2\}$ of all the subregions;

$$\Delta C_{r,r+1}(t) = c_r(t) - c_{r+1}(t) \quad (7)$$

wherein $c_r(t)$ denotes the lane changing pressure of the rth subregion at the time t, $c_{r+1}(t)$ denotes the lane changing pressure of the (r+1)th subregion at the time t, and r=1, 2;

7, two subregions having the larger absolute values of the lane changing pressure differences are selected from the lane changing pressure difference $\{\Delta C_{r,r+1}(t)|r=1, 2\}$ of all subregions to be prioritized for lane changing: whether $\Delta C_{r,r+1}(t)>0$ is valid is determined, if $\Delta C_{r,r+1}(t)>0$ is valid, operation 7.1 is performed; otherwise, operation 10 is performed;

7.1, whether $|\Delta C_{r,r+1}(t)|>\theta$ is valid is determined, and if $|\Delta C_{r,r+1}(t)|>\theta$ is valid, operation 7.2 is performed; otherwise, lane changing of the vehicles within the influence region of the bus stop is prohibited, and operation 13 is performed; wherein $\theta$ denotes a lane changing threshold;

7.2, a count of vehicles $N_{r \to r+1}(t)$ that are allowed to transfer from the rth subregion to the (r+1)th subregion is calculated by using an equation (8);

$$\left(\frac{\lambda_1}{k_m} + \frac{\lambda_2}{v_f k_e}\right)\left(\frac{N_r(t) - N_{r \to r+1}(t)}{L_r(t)} - \frac{N_{r+1}(t) + N_{r \to r+1}(t)}{L_{r+1}(t)}\right) = \theta \quad (8)$$

wherein $N_r(t)$ denotes a count of vehicles in the rth subregion at the time t, and $L_r(t)$ denotes a length of the rth subregion at the time t; $N_{r+1}(t)$ denotes a count of vehicles in the (r+1)th subregion at the time t, and $L_{r+1}(t)$ denotes a length of the (r+1)th subregion at the time t;

8, an ith vehicle in the rth subregion within the influence region of the bus stop at the time t is denoted as $q_i^r(t)$, a next vehicle in the (r+1)th subregion relative to the ith vehicle $q_i^r(t)$ in the rth subregion is denoted as $q_{j+1}^{r+1}(t)$, and a previous vehicle in the (r+1)th subregion relative to the ith vehicle $q_i^r(t)$ in the rth subregion is denoted as $q_j^{r+1}(t)$;

8.1, whether the ith vehicle $q_i^r(t)$ in the rth subregion at the time t satisfies a safety lane changing condition in an equation (9) is determined; if the ith vehicle $q_i^r(t)$ in the rth subregion at the time t satisfies the safety lane changing condition in the equation (9), the ith vehicle $q_i^r(t)$ is added to a lane changing set $P_{r \to r+1}(t)$; otherwise, it is indicated that the ith vehicle $q_i^r(t)$ cannot be transferred to the (r+1)th subregion at a safety lane changing spacing, and the ith vehicle $q_i^r(t)$ continues to travel in the rth subregion, thereby obtaining the lane changing set $P_{r \to r+1}(t)$;

$$\begin{cases} x_{r+1,j}(t) - x_{r,i}(t) \geq L_{r+1,j}(t) \\ x_{r,i}(t) - x_{r+1,j+1}(t) \geq L_{r+1,j+1}(t) \\ L_{r+1,j}(t) = \dfrac{v_{r+1,j}(t) \cdot \Delta t_c}{3} + 10 - l_{veh} \\ L_{r+1,j+1}(t) = \dfrac{v_{r+1,j+1}(t) \cdot \Delta t_c}{3} + 10 - l_{veh} \end{cases} \quad (9)$$

wherein $x^{r,i}(t)$ denotes a position horizontal coordinate of $q_i^r(t)$; $x_{r+1,j}(t)$ denotes a position horizontal coordinate of $q_j^{r+1}(t)$; $x_{r+1,j+1}(t)$ denotes a position horizontal coordinate of $q_{j+1}^{r+1}(t)$; $L_{r+1,j}(t)$ denotes the safety lane changing spacing between $q_i^r(t)$ and $q_j^{r+1}(t)$; $L_{r+1,j+1}(t)$ denotes the safety lane changing spacing between $q_i^r(t)$ and $q_{j+1}^{r+1}(t)$; $v_{r+1,j}(t)$ denotes a speed of $q_j^{r+1}(t)$, and $v_{r+1,j+1}(t)$ denotes a speed of $q_{j+1}^{r+1}(t)$; $l_{veh}$ denotes a length of a vehicle body; and $\Delta t_c$ denotes a duration of lane changing;

9, whether a count of vehicles $M_{r \to r+1}^t \leq N_{r \to r+1}(t)$ in the lane changing set $P_{r \to r+1}(t)$ in the rth subregion within the influence region of the bus stop is valid is determined; if the count of vehicles $M_{r \to r+1}^t \leq N_{r \to r+1}(t)$ in the lane changing set $P_{r \to r+1}(t)$ in the rth subregion within the influence region of the bus stop is valid, all the vehicles in the lane changing set $P_{r \to r+1}(t)$ in the rth subregion complete lane changing to the (r+1)th subregion, and operation 13 is performed; otherwise, a distance $d_{r,i}(t)$ between a vehicle $q_i^r(t)$ in the rth subregion and a previous vehicle $q_{i-1}^r(t)$ is calculated by using an equation (10) to obtain distances between all the vehicles in the lane changing set $P_{r \to r+1}(t)$, and all the vehicles in the lane changing set $P_{r \to r+1}(t)$ are arranged in an ascending order based on the distances between all the vehicles to select top $N_{r \to r+1}(t)$ vehicles in the rth subregion with smallest spacings to fronts of the previous vehicles to complete lane changing to the (r+1)th subregion, and operation 13 is performed;

$$d_{r,i}(t) = x_{r,i-1}(t) - x_{r,i}(t) \quad (10)$$

wherein $x_{r,i-1}(t)$ denotes a position horizontal coordinate of the previous vehicle $q_{i-1}^r(t)$ of the vehicle $q_i^r(t)$ in the rth subregion;

10, whether $\Delta C_{r,r+1}(t) > \theta$ is valid is determined, and if $|\Delta C_{r,r+1}(t)| > \theta$ is valid, operation 10.1 is performed; otherwise, the vehicles within the influence region of the bus stop are not allowed to change lanes, and operation 13 is performed;

10.1, a count of vehicles $N_{r \to r+1}(t)$ that are allowed to transfer from the (r+1)th subregion to the rth subregion is calculated by using an equation (11);

$$\left( \dfrac{\lambda_1}{k_m} + \dfrac{\lambda_2}{v_f k_e} \right) \left( \dfrac{N_{r+1}(t) - N_{r+1 \to r}(t)}{L_{r+1}(t)} - \dfrac{N_r(t) + N_{r+1 \to r}(t)}{L_r(t)} \right) = \theta \quad (11)$$

11, the uth vehicle in the (r+1)th subregion within the influence region of the bus stop at the time t is denoted as $q_u^{r+1}(t)$, a latter vehicle in the rth region relative to the uth vehicle $q_u^{r+1}(t)$ in the (r+1)th subregion is denoted as $q_{w+1}^r(t)$, and a previous vehicle in the rth subregion relative to the uth vehicle $q_u^{r+1}(t)$ in the (r+1)th subregion is denoted as $q_w^r(t)$;

11.1, whether the uth vehicle $q_u^{r+1}(t)$ in the (r+1)th subregion at the time t satisfies a safety lane changing condition shown in an equation (12) is determined, if the uth vehicle $q_u^{r+1}(t)$ in the (r+1)th subregion at the time t satisfies the safety lane changing condition shown in the equation (12), the uth vehicle $q_u^{r+1}(t)$ is added to a lane changing set $P_{r+1 \to r}(t)$; otherwise, it is indicated that the uth vehicle $q_u^{r+1}(t)$ cannot be transferred to the rth subregion at the safety lane change spacing, and the uth vehicle $q_u^{r+1}(t)$ continues to travel in the (r+1)th subregion, thereby obtaining the lane changing set $P_{r \to r+1}(t)$;

$$\begin{cases} x_{r,w}(t) - x_{r+1,u}(t) \geq L_{r,w}(t) \\ x_{r+1,u}(t) - x_{r,w+1}(t) \geq L_{r,w+1}(t) \\ L_{r,w}(t) = \dfrac{v_{r,w}(t) \cdot \Delta t_c}{3} + 10 - l_{veh} \\ L_{r,w+1}(t) = \dfrac{v_{r,w+1}(t) \cdot \Delta t_c}{3} + 10 - l_{veh} \end{cases} \quad (12)$$

wherein $x_{r+1,u}(t)$ denotes a position horizontal coordinate of $q_u^{r+1}(t)$; $x_{r,w}(t)$ denotes a position horizontal coordinate of $q_w^r(t)$; $x_{r,w+1}(t)$ denotes a position horizontal coordinate of $q_{w+1}^r(t)$; $L_{r,w}(t)$ denotes the safety lane changing spacing between $q_w^r(t)$ and $q_u^{r+1}(t)$; $L_{r,w+1}(t)$ denotes the safety lane changing spacing between $q_{w+1}^r(t)$ and $q_u^{r+1}(t)$; $v_{r,w}(t)$ denotes a speed of $q_w^r(t)$, $v_{r,w+1}(t)$ denotes a speed of $q_{w+1}^r(t)$, and $\Delta t_c$ denotes the duration of lane changing;

12, whether a count of vehicles $M_{r+1 \to r}^t \leq N_{r+1 \to r}(t)$ in the lane changing set $P_{r+1 \to r}(t)$ in the (r+1)th subregion within the influence region of the bus stop is valid is determined, and if the count of vehicles $M_{r+1 \to r}^t \leq N_{r+1 \to r}(t)$ in the lane changing set $P_{r+1 \to r}(t)$ in the (r+1)th subregion within the influence region of the bus stop is valid, all the vehicles in the lane changing set $P_{r+1 \to r}(t)$ in the (r+1)th subregion complete lane changing to the rth subregion; otherwise, a distance $d_{r+1,u}(t)$ between the vehicle $q_u^{r+1}(t)$ in the (r+1)th subregion and the previous vehicle $q_{u-1}^{r+1}(t)$ is calculated by using an equation (13) to obtain distances between all the vehicles in the lane changing set $P_{r+1 \to r}(t)$, and all the vehicles in the lane changing set $P_{r+1 \to r}(t)$ are arranged in an ascending order based on the distances between all the vehicles to select top $N_{r+1 \to r}(t)$ vehicles in the (r+1)th subregion with smallest spacings to fronts of the previous vehicles to complete lane changing to the rth subregion;

$$d_{r+1,u}(t) = x_{r+1,u-1}(t) - x_{r+1,u}(t) \quad (13)$$

wherein $x_{r+1,u-1}(t)$ denotes a position horizontal coordinate of the previous vehicle $q_{u-1}^{r+1}(t)$ of $q_u^{r+1}(t)$ in the (r+1)th subregion;

13, whether $x_{bus}(t) < x_{Ldown}$ is valid is determined, if $x_{bus}(t) < x_{Ldown}$ IS valid, $t + \Delta t$ is assigned to t and the process returns to the operation 4; otherwise, the control process is ended, wherein $x_{bus}(t)$ denotes a position horizontal coordinate of the bus at the time t.

2. An electronic device comprising a storage device and a processor, wherein the storage device is configured to store programs for supporting the processor in executing the method for traffic flow control of claim 1, and the processor is configured to execute the programs stored in the storage device.

3. A computer-readable storage medium comprising computer programs that, when executed by a processor, direct the processor to execute the method for traffic flow control of claim 1.

\* \* \* \* \*